United States Patent
Tanaka et al.

(10) Patent No.: US 6,512,613 B1
(45) Date of Patent: Jan. 28, 2003

(54) WDM TRANSMISSION REPEATER, WDM TRANSMISSION SYSTEM AND WDM TRANSMISSION METHOD

(75) Inventors: Shigeru Tanaka, Kanagawa (JP); Masayuki Nishimura, Kanagawa (JP); Masayuki Shigematsu, Kanagawa (JP); Yasunori Murakami, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/380,503

(22) PCT Filed: Mar. 24, 1999

(86) PCT No.: PCT/JP99/01487
§ 371 (c)(1),
(2), (4) Date: Sep. 3, 1999

(87) PCT Pub. No.: WO99/49601
PCT Pub. Date: Sep. 30, 1999

(30) Foreign Application Priority Data

Mar. 24, 1998 (JP) .......................................... 10-075704

(51) Int. Cl.[7] .............................................. H04J 14/02
(52) U.S. Cl. ........................ 359/124; 359/127; 359/130; 385/27
(58) Field of Search ................. 359/110, 127, 359/130, 124; 385/37

(56) References Cited

U.S. PATENT DOCUMENTS 6,069,719 A * 6/2000 Mizrahi ...................... 359/124
6,078,413 A * 6/2000 Yamaguchi ................. 359/124
6,115,158 A * 9/2000 Kaneko ...................... 259/124

FOREIGN PATENT DOCUMENTS

| JP | 5-100254 | 4/1993 |
| JP | 5-102928 | 4/1993 |
| JP | 9-261175 | 10/1997 |
| JP | 10-13356 | 1/1998 |
| JP | 1013357 | 1/1998 |
| JP | 10-13382 | 1/1998 |

OTHER PUBLICATIONS

"All–fiber add/drop multiplexing of 6×10 Gbit/s using a photo–induced Bragg grating filter for WDM networks", T. Mizuochi et al., OFC '96 Technical Digest, pp. 116–117 (English language counterpart of "A Study on Optical Add–Drop Multiplexers using Fiber Grating Filters").

"A Study on Optical Add–Drop Multiplexers using Fiber Grating Filters", T. Mizuochi et al., Communication Systems Laboratory, Mitsubishi Electric Corporation, pp. 476–477, 1995.

"128 channel–480 km Transmission Experiment utilizing 0.98 µm Pumped Erbium–Doped Fiber Amplifiers and A Tunable Gain Equalizer", K. Oda et al., Technical Report of IEICE, Mar. 6, 1998, pp. 61–68.

* cited by examiner

*Primary Examiner*—Daniel J. Wu
(74) *Attorney, Agent, or Firm*—McDermott, Will & Emery

(57) ABSTRACT

The present invention relates to a WDM transmission system and the like suitable for optical communications between local stations having a relatively short repeater interval. In particular, the WDM transmission repeater employed in the WDM transmission system demultiplexes a plurality of signal lights propagating through a transmission line into first and second groups, takes out the second group, comprises a multiplexer for sending into the transmission line a new WDM signal group in which the first group thus demultiplexed and a third group of signal lights different from those of the first group are multiplexed, and has a special structure for reducing the influence of the not-demultiplexed crosstalk components within the second group upon the optical communications.

9 Claims, 6 Drawing Sheets

WDM TRANSMISSION REPEATER, WDM TRANSMISSION SYSTEM AND WDM TRANSMISSION METHOD

This application is a 371 continuation of PCT/JP99/01487, filed Mar. 24, 1999, which claims priority on Japan Application No. 075704/1999, filed Mar. 24, 19998.

TECHNICAL FIELD

The present invention relates to a WDM (Wavelength Division Multiplexing) transmission system which transmits a plurality of signal lights having wavelengths different from each other, a WDM transmission repeater provided in an optical transmission line in the WDM transmission system, and a WDM transmission method in such a WDM transmission system.

BACKGROUND ART

By transmitting a WDM signal group including a plurality of signal lights with wavelengths different from each other through an optical fiber line as a transmission line, a WDM transmission system enables high-speed, large-capacity optical communications. It enables large-capacity optical communications, e.g., 32 channels (utilizing 32 signal lights) at 2.5 Gb/s, even in the case where an existing single-mode optical fiber line network is employed. As a consequence, the introduction of WDM transmission system has recently been under way in order to respond to rapid increases in communication demands such as those in Internet or the like.

In such a WDM transmission system, there are cases where a repeater base station having a WDM transmission repeater is disposed somewhere in the transmission line from a transmitter within a transmitter base station to a receiver within a receiver base station. The WDM transmission repeater is equipped with an optical amplifier, an optical ADM (Add-Drop Multiplexer), and the like. The optical amplifier functions to collectively optically amplify the WDM signal group propagating through the transmission line. The optical ADM functions to demultiplex the WDM signal group into a first group of signal lights and a second group of signal lights different from those of the first group, receive the second group of signal lights, multiplex a separate third group of signal lights with the first group of signal lights, and send the resulting new WDM signal group into the transmission line again.

DISCLOSURE OF THE INVENTION

As a result of studies of the conventional WDM transmission systems thus configured, the inventors have found the problems as follows.

Namely, the conventional WDM transmission systems and WDM transmission repeaters are designed so as to be applicable to long-haul main lines, so that the distance between adjacent repeaters is long, e.g., on the order of 60 km to 80 km, in such a WDM transmission system. As a consequence, the optical amplifier within each WDM transmission repeater is required to have such properties as a wide band and high gain, a minimum gain deviation (fluctuation in gain between individual signal lights having their respective wavelengths), and the like in order to collectively compensate for the transmission loss of the whole signal lights propagating between the repeaters having such a long distance therebetween. However, not only such a high-performance optical repeater is expensive, but also its reliability is hard to secure.

In the local inter-station transmission, by contrast, the distance between the adjacent repeaters is relatively short, i.e., a few km to ten plus several km, and the received signal light level at each repeater is high, whereby it is often unnecessary to utilize optical amplifiers having a high gain or any optical amplifiers at all. Also, in general, since signal lights are received and transmitted by each repeater, it is often unnecessary for all the signal lights having wavelengths different from each other to be optically amplified with a uniform gain. Consequently, the conventional WDM transmission repeaters for long-haul main lines, equipped with high-performance expensive optical repeaters, are not suitably applicable to local interstation WDM transmission systems in terms of cost and equipment. It is not so economical to apply such conventional WDM transmission repeaters to the local inter-station WDM transmission system as in the case of applying the WDM transmission system with a long-haul main line.

In order to overcome the problems such as those mentioned above, it is an object of the present invention to provide a WDM transmission system suitable as optical communication means between local stations, a WDM transmission repeater suitable for the WDM transmission system, and a WDM transmission method in such a WDM transmission system.

The WDM transmission system according to the present invention comprises a plurality of WDM transmission repeaters, whereas the interval between these WDM transmission repeaters is not greater than 20 km, thereby enabling optical communications suitable for relatively short inter-station transmission.

In such a WDM transmission system, it is unnecessary to use a wide-band optical amplifier which can amplify all of a plurality of signal lights, and a narrow-band amplifier which can optically amplify a small number of demultiplexed signal lights is sufficiently applicable thereto. Here, the distance between the respective center wavelengths of the individual signal lights is not greater than a few nm. Specifically, there are transmission modes of 1.6 nm, 0.8 nm, 0.6 nm, and the like. As a consequence, though the number of employed WDM transmission repeaters, i.e., the number of optical amplifiers, increases, these optical amplifiers can utilize inexpensive products, and the optical amplifiers become unnecessary in some instances, whereby the system as a whole can be realized at a low cost. Also, since the distance between the repeaters is relatively short, i.e., 20 km or less, no high output is required for the optical amplifiers employed, whereby a sufficient degree of reliability is secured. In addition, since only a small number of signal lights in the WDM signal group propagating through the transmission line are optically amplified by each WDM transmission repeater, the risk of all the channels (all the signal lights) failing to establish communications is low in the event of failure of an optical amplifier in any of the WDM transmission repeaters.

The WDM transmission repeater according to the present invention has a configuration suitable for the above-mentioned WDM transmission system and is installed in a transmission line through which a WDM signal group including a plurality of signal lights having wavelengths different from each other within a usable wavelength band propagates. The WDM transmission repeater comprises an optical ADM having an entrance end for receiving the WDM signal group from the transmission line; a first port for taking out, from first and second groups each composed of one or more signal lights and separated from the WDM signal group taken in by way of the entrance end, the second group of signal lights; a second port for receiving a third group of signal lights composed of one or more signal lights within the usable wavelength band, each having a wavelength different from those of the first group; and an output end for sending to the transmission line a new WDM signal group including the first group of signal lights and the third group of signal lights taken in by way of the second port.

Also, the WDM transmission repeater according to the present invention may be configured so as to comprise, in addition to the optical ADM, at least one of a first optical amplifier for amplifying the second group of signal lights taken out from the first port of the optical ADM and a second optical amplifier for amplifying the third group of signal lights to be received from the second port of the optical ADM.

In a configuration such as that mentioned above, the taken-out second group of signal lights is amplified by the first optical amplifier, whereby a sufficient receiving sensitivity is assured in the WDM transmission repeater at the next stage. On the other hand, as the newly introduced third group of signal lights is amplified by the second optical amplifier, the light intensity of the crosstalk component in each of the signal lights in the not-demultiplexed second group can be lowered relative to the light intensity of the WDM signal group (mainly including the first and third groups of signal lights). Namely, it becomes more likely to determine that signal lights in the second group are signal lights each having a level not higher than a permissible crosstalk level at which the WDM transmission repeater at the next stage does not receive the second group of signal lights as a significant optical signal.

Further, the WDM transmission repeater according to the present invention may be configured so as to comprise a demultiplexer (included in a wavelength separating device) having an input port, optically connected to the first port of the optical ADM, for receiving the second group of signal lights from the first port, and at least one output port, each prepared for evry signal light in the second group taken in by way of the input port, for taking out a signal light associated therewith; and a multiplexer (included in a wavelength multiplexing device) having at least one input port, each prepared for every signal light in the third group to be newly introduced to the transmission line, for receiving a signal light associatedd therewith, and an output port, optically connected to the second port of the optical ADM, for sending the third group of signal lights to the second port. In such a configuration, the first and second ports of the optical ADM may be connected to the input port of the demultiplexer and the output port of the multiplexer, respectively, either directly or by way of the first and second optical amplifiers, respectively.

In a configuration such as that mentioned above, each of the demultiplexer and multiplexer is preferably provided with a structure for enabling attachment and detachment of a respective end portion of a branch line for optically connecting a selected output port in the output ports of the demultiplexer to a selected input port in the input ports of the multiplexer, in order to effectively respond to an increase or decrease in the number of subscribers to be connected. In this case, a selected output port in the output ports of the demultiplexer has a first joint structure for enabling attachment and detachment of a first end of the branch line for optically connecting the selected output port of the demultiplexer to a selected input port in the input ports of the multiplexer. Also, a selected input port of the multiplexer has a second joint structure for enabling attachment and detachment of a second end of the branch line opposed to the first end thereof.

In this configuration, when one selected output port of the demultiplexer and one input port of the multiplexer are optically connected to each other by way of a bypass line, part of the signal lights (included in the second group) taken out from the output port of the demultiplexer is taken into the multiplexer from the input port thereof by way of the bypass line, so as to constitute part of the third group of signal lights. When this bypass line is removed from between the demultiplexer and the multiplexer, each of the wave number of signal light receivable by the WDM transmission repeater and the signal lights transmittable thereby would increase. Consequently, wave number control can easily be carried out in response to an increase or decrease in subscribers for each repeater base station, as the bypass line is attached thereto and detached therefrom.

Further, the WDM transmission repeater according to the present invention may have a configuration which can tolerate a certain degree of propagation of a crosstalk component in the signal lights (in second group) to be taken out (a relatively inexpensive optical ADM having a low demultiplexing performance can be used). Namely, this WDM transmission repeater has a structure in which at least two optical ADMs having the same function are optically connected to each other by a bridge line. In this configuration, the optical ADM at the first stage for receiving the WDM signal group from the transmission line does not use the port for inputting the third group of signal lights. Also, in the optical ADM at the second or later stage for sending a new WDM signal group into the transmission line, the port for taking out the second group of signal lights from the received WDM signal group is not used (the optical ADM at the second or later stage functioning as an optical filter for blocking the second group of signal lights in this case). As a plurality of optical ADMs optically connected to each other by way of the bridge line are utilized to realize the original function of the optical ADM, the crosstalk component of the second group of signal lights to be taken out can be reduced to a receiving sensitivity level in the WDM transmission repeater at the next stage or lower (i.e., permissible crosstalk level or lower).

Here, the WDM transmission repeater equipped with a plurality of optical ADMs as mentioned above may also comprise the above-mentioned demultiplexer and multiplexer, and the demultiplexer and multiplexer can be provided with a structure for enabling attachment and detachment of a bypass line for optically connecting one selected output port in the demultiplexer and a selected input port in the multiplexer to each other. Also, the WDM transmission repeater may be configured such that a first optical amplifier is installed between the demultiplexer and the port for taking out the second group of signal lights for amplifying the second group thus taken-out of signal lights, whereas a second optical amplifier is installed between the multiplexer and the port for receiving the third group of signal lights for amplifying the third group of signal lights.

In a WDM transmission repeater having a structure suitable for a WDM transmission system which can be realized by various kinds of structures mentioned above, the WDM transmission repeater being selected from a plurality of WDM transmission repeaters in the WDM transmission system, the WDM transmission method according to the present invention is characterized in that the signal level of each signal light in the second group is individually adjusted so as to satisfy both of a first condition that it exceeds a receiving sensitivity level of the WDM transmission repeater at an entrance end thereof and a second condition that it is lower than a receiving sensitivity level of the adjacently downstream WDM transmission repeater at the next stage at an entrance end thereof.

Preferably, in the configuration such as that mentioned above, signal level adjustment for the second group of signal lights is carried out in the WDM transmission repeater (including the transmitting station), positioned upstream, for amplifying the second group of signal lights. Namely, the WDM transmission repeater positioned upstream separately amplifies the individual signal lights in the second group so that their respective signal levels satisfy both the above-mentioned first and second conditions.

In this WDM transmission method, the respective signal levels of the individual lights in the second group are appropriately adjusted in the WDM transmission repeater (any of the transmitting station and the WDM transmission repeater positioned upstream) sending out the second group. Consequently, of the propagating WDM signal group, each of the individual signal lights in the second group to be taken out by the WDM transmission repeater has a signal level not lower than the receiving sensitivity level of the WDM transmission repeater, so as to be reliably received. Also, of the second group of signal lights to be taken out, the crosstalk component directed to the WDM transmission repeater (any of the receiving station and the WDM transmission repeater positioned downstream) at the next stage is not higher than a permissible crosstalk level, whereby the signal lights to be taken out from the signal lights in the first and third groups is reliably received by the WDM transmission repeater at this next stage.

Further, the WDM transmission method according to the present invention is characterized in that, in a WDM transmission repeater selected from a plurality of WDM transmission repeaters in the above-mentioned WDM transmission system, the center wavelength of each signal light in the introduced third group exists between the center wavelengths of two signal lights adjacent to each other in a plurality of signal lights included in a WDM signal group, and is set so as to not to be lower than a predetermined crosstalk suppressing ratio with respect to each of the two wavelengths.

Specifically, in the WDM transmission system according to the present invention, it is preferred that the respective intensities of signal lights in the first group at the respective center wavelengths of signal lights in the third group be set lower than the respective peak intensities of the signal lights in the first group by 25 dB or more. Also, the respective center wavelengths of signal lights in the third group are preferably set so as to exist between the respective center wavelengths of two signal lights adjacent to each other in the second group of signal lights, whereas the respective intensities of the signal lights in the second group at the respective center wavelengths of signal lights in the third group are set so as to be lower than the respective peak intensities of signal lights in the second group by 10 dB or more. In any of these cases, the crosstalk component of each signal light in the second group is kept from affecting the system.

Here, the respective center wavelengths of signal lights in the third group may be identical to the respective center wavelengths of signal lights in the second group, totally different from the respective center wavelengths of signal lights in the second group, or exist between the respective center wavelengths of received signal lights (included in the WDM signal group that has propagated through the transmission line). Also, each of the first, second, and third groups includes one or more signal lights.

BEST MODES FOR CARRYING OUT THE INVENTION

In the following, the WDM transmission system, WDM transmission repeater, and WDM transmission method according to the present invention will be explained with reference to FIGS. 1 to 7. Among the drawings, structures and elements identical to each other will be referred to with numerals or letters identical to each other without repeating their overlapping explanations. Also, though the WDM signal group transmitted by the WDM transmission system is explained as the one including 32 waves (32 channels) of signal light in the following, cases with different wave numbers are similar thereto.

Figure 1:
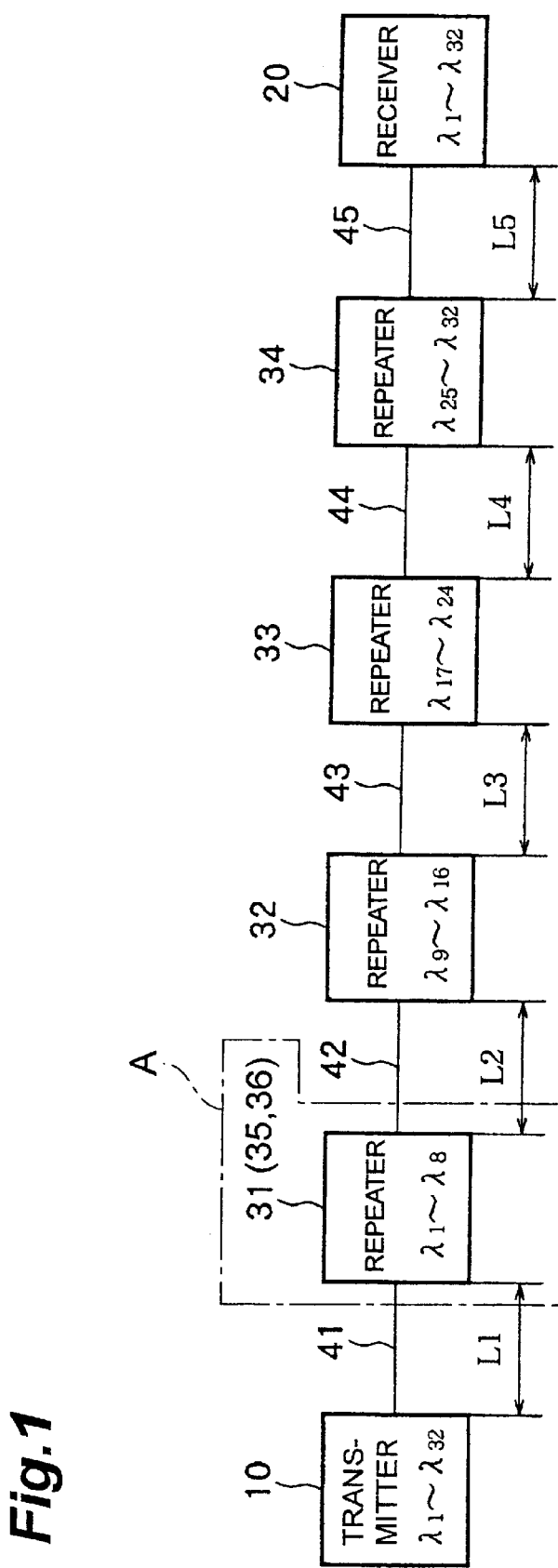
FIG. 1 is a schematic configurational diagram showing the overall configuration of a WDM transmission system according to the present invention.

First, a WDM transmission system according to the present invention will be explained. FIG. 1 is a diagram showing the schematic configuration of this WDM transmission system.

As shown in FIG. 1, the WDM transmission system according to the present invention comprises a transmitter 10 provided in a transmitting base station; a receiver 20 disposed in a receiving base station; a plurality of repeaters 31 to 34 disposed between the transmitter 10 and the receiver 20; and optical fiber lines 41 to 45 connecting these members, through which a WDM signal group including a plurality of signal lights (32 waves $\lambda 1$ to $\lambda 32$ in this embodiment) propagates.

The transmitter 10 sends 32 waves of a WDM signal group ($\lambda 1$ to $\lambda 32$) to the optical fiber line 41, while each wave is at its predetermined signal level. The WDM transmission repeater 31 receives the WDM signal group ($\lambda 1$ to $\lambda 32$) including 32 waves having arrived by way of the optical fiber line 41 from the transmitter 10, and demultiplexes it into a first group of signal lights ($\lambda 9$ to $\lambda 32$) and a second group of signal lights ($\lambda 1$ to $\lambda 8$). The second group of signal lights thus obtained of signal lights is received by the WDM transmission repeater 31. On the other hand, the WDM transmission repeater 31 multiplexes the first group of signal lights and a third group of signal lights including no wavelength common with those of the first group, and sends the resulting new WDM signal group to the optical fiber line 42. Here, in this embodiment, the signal lights in the third group are identical to the respective signal lights in the second group.

The WDM transmission repeater 32 at the next stage receives the WDM signal group ($\lambda 1$ to $\lambda 32$) including 32 waves having arrived by way of the optical fiber line 42 from the WDM transmission repeater 31 at the previous stage positioned upstream thereof, and demultiplexes it into a first group of signal lights (λ1 to λ8, λ17 to λ32) and a second group of signal lights (λ9 to λ16). The second group thus obtained of signal lights is received by the WDM transmission repeater 32. On the other hand, the WDM transmission repeater 32 multiplexes the first group of signal lights and a third group of signal lights including no wavelength common with those of the first group, and sends the resulting new WDM signal group to the optical fiber line 43. Here, in this embodiment, the signal lights in the third group are identical to the respective signal lights in the second group.

Further, the WDM transmission repeater 33 feeds therein the WDM signal group (λ1 to λ32) including 32 waves having arrived by way of the optical fiber line 43 from the WDM transmission repeater 32 at the previous stage positioned upstream thereof, and demultiplexes it into a first group of signal lights (λ1 to λ16, λ25 to λ32) and a second group of signal lights (λ17 to λ24). The second group thus obtained of signal lights is received by the WDM transmission repeater 33. On the other hand, the WDM transmission repeater 33 multiplexes the first group of signal lights and a third group of signal lights including no wavelength common with those of the first group, and sends the resulting new WDM signal group to the optical fiber line 44. Here, in this embodiment, the signal lights in the third group are identical to the respective signal lights in the second group.

The WDM transmission repeater 34 feeds therein the WDM signal group (λ1 to λ32) including 32 waves having arrived by way of the optical fiber line 44 from the WDM transmission repeater 33 at the previous stage positioned upstream thereof, and demultiplexes it into a first group of signal lights (λ1 to λ24) and a second group of signal lights (λ25 to λ32). The second group thus obtained of signal lights is received by the WDM transmission repeater 34. On the other hand, the WDM transmission repeater 34 multiplexes the first group of signal lights and a third group of signal lights including no wavelength common with those of the first group, and sends the resulting new WDM signal group to the optical fiber line 45. Here, in this embodiment, the signal lights in the third group are identical to the respective signal lights in the second group. Then, the receiver 20 feeds therein the WDM signal group (λ1 to λ32) including 32 waves having arrived by way of the optical fiber line 45 from the WDM transmission repeater 34, and receives each signal light.

As a consequence, in the WDM transmission system according to this embodiment, of the WDM signal group (32 waves of λ1 to λ32) sent out from the transmitter 10, eight signal lights (λ1 to λ8) are received by the WDM transmission repeater 31 at the first stage. Subsequently, the WDM transmission repeater 32 at the second stage receives, of the WDM signal group having arrived, eight signal lights (λ9 to λ16). The WDM transmission repeater 33 at the third stage receives, of the WDM signal group having arrived, eight signal lights (λ17 to λ24). The WDM transmission repeater 34 at the fourth stage receives, of the WDM signal group having arrived, eight signal lights (λ25 to λ32). Eventually, the receiver 20 receives the eight signal lights (λ1 to λ8) sent out from the WDM transmission repeater 31, the eight signal lights (λ9 to λ16) sent out from the WDM transmission repeater 32, the eight signal lights (λ17 to λ24) sent out from the WDM transmission repeater 33, and the eight signal lights (λ25 to λ32) sent out from the WDM transmission repeater 34.

In each of the WDM transmission repeaters 31 to 34, the third group of signal lights multiplexed with the signal lights passing therethrough may not necessarily be identical to the demultiplexed second group of signal lights. Nonetheless, it is necessary that each signal light of the WDM signal group transmitted by the WDM transmission system according to this embodiment be included in an amplification band of an optical amplifier when the latter is provided, and also in a wavelength band where transmission loss is low in the optical fiber lines 41 to 45.

In the WDM transmission system according to this embodiment, each of the distances between the individual WDM transmission repeaters 31 to 34, i.e., the respective lengths L1 to L5 of the optical fiber lines 41 to 45, is designed to be relatively short, i.e., 20 km or less. Therefore, the transmission loss of WDM signal group is small in each of the optical fiber lines 41 to 45, whereby, as will be explained in the following, the WDM transmission repeater according to the present invention has a simpler configuration and can be manufactured less expensively as compared with the conventional WDM transmission repeater.

FIRST EMBODIMENT OF WDM TRANSMISSION REPEATER

Figure 2:
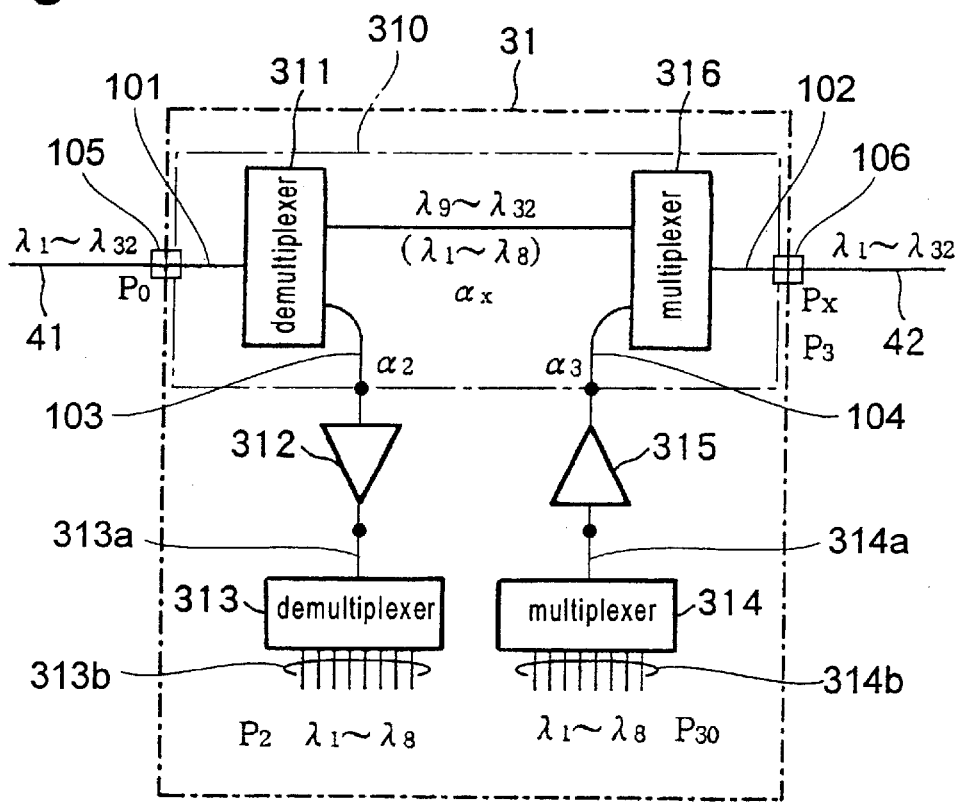
FIG. 2 is a diagram showing the schematic configuration of a first embodiment of the WDM transmission repeater according to the present invention.

FIG. 2 is a diagram showing the schematic configuration of a first embodiment of the WDM transmission repeater according to the present invention. Though the following explanation relates to the WDM transmission repeater 31 (the part indicated by A in FIG. 1) at the first stage in the WDM transmission system shown in FIG. 1, the other WDM transmission repeaters have similar configurations.

As shown in FIG. 2, the WDM transmission repeater 31 according to the first embodiment comprises a demultiplexer 311, an optical amplifier 312, a demultiplexer 313 (included in a wavelength separating device), a multiplexer 314 (included in a wavelength multiplexing device), an optical amplifier 315, a multiplexer 316, and optical lines connecting these members.

The demultiplexer 311 demultiplexes 32 waves of a WDM signal group (λ1 to λ32). having entered there by way of an entrance end 101, which is optically connected to the optical fiber line 41 via a connector 105, into a first group of signal lights (λ9 to λ32) and a second group of signal lights (λ1 to λ8) which are different from those of the first group. The second group of signal lights to be taken out is guided to the optical amplifier 312 by way of an output port 103. The optical amplifier 312 collectively optically amplifies the second group of signal lights demultiplexed from the demultiplexer 311. Further, the demultiplexer 313 receives, by way of an input port 313a, the second group of signal lights amplified by the optical amplifier 312, demultiplexes respective lights of the second group, and guides them to their respective output ports 313b. A photodetector device such as photodiode (not illustrated), for example, is connected to each output port 313b, and the individual signal lights in the second group emitted from the respective output ports 313b are detected by their corresponding photodetector devices.

The multiplexer 314 receives the individual signal lights (λ1 to λ8) in the third group from their corresponding input ports 314b, multiplexes these signal lights, and emits the lights thus multiplexed to the optical amplifier 315 by way of the output port 314a. The optical amplifier 315 collectively optically amplifies the third group of signal lights emitted from the multiplexer 314. The multiplexer 316 receives the first group of signal lights and also receives, by way of the input port 104, the third group of signal lights amplified by the optical amplifier 315, so as to multiplex them into a new WDM signal group, which is emitted into the optical fiber line 42 by way of an exit end 102. The exit end 102 is optically connected to the optical fiber line 42 by way of a connector 106.

Figure 3:
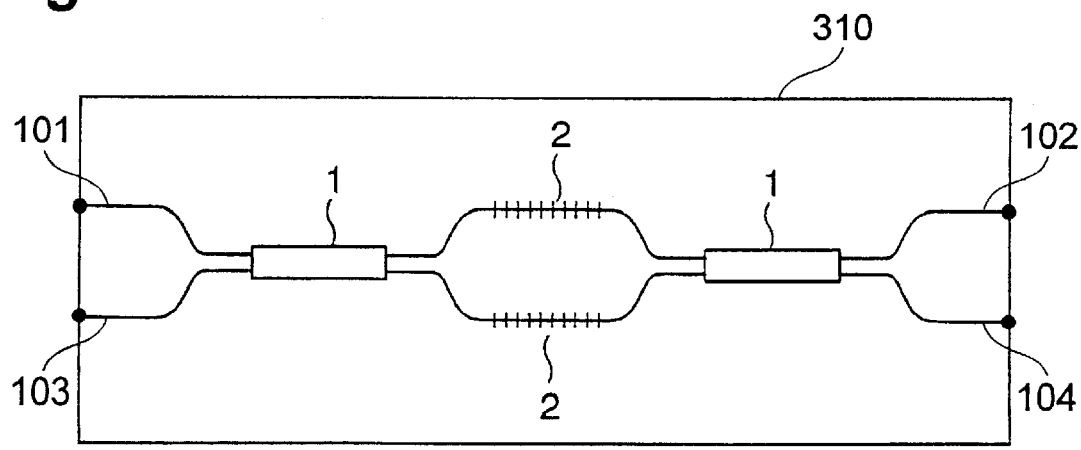
FIG. 3 is a diagram showing, as a specific example of optical ADM, a Mach-Zehnder interferometer constituted by an optical fiber coupler and a fiber grating.

The demultiplexer 311 and the multiplexer 316 constitute an optical ADM 310 (Add-Drop Multiplexer). Applicable examples of the optical ADM 310 include an AWG (Arrayed Waveguide Grating)., an optical circulator, and the like. Since these optical devices are expensive, however, an inexpensive Mach-Zehnder interferometer constituted by an optical fiber coupler 1 and a fiber grating 2, as shown in FIG. 3, is employed as the demultiplexer 311 and multiplexer 316 of the optical ADM 310 in this embodiment. When the demultiplexer 311 and multiplexer 316 are constituted by the above-mentioned Mach-Zehnder interferometer, however, a problem of crosstalk may occur (see, for example, The Institute of Electronics, Information and Communication Engineers, Communication Society Convention 1995, SB-9-5). Namely, though the major part of the second group of signal lights ($\lambda 1$ to $\lambda 8$) is demultiplexed by the demultiplexer 311 and outputted to the optical amplifier 312, a part thereof may leak from the demultiplexer 311 to the multiplexer 316 as crosstalk. Therefore, the WDM transmission repeater according to this embodiment solves this problem of crosstalk in the following manner.

Let the intensity of each of 32 waves of the WDM signal group having arrived at the demultiplexer 311 of the WDM transmission repeater 31 be P0 (dBm), and the intensity of each of signal lights in the third group fed into the respective input ports of the multiplexer 314 be P30 (dBm). Also, let the transmission loss with respect to each signal light in the second group leaking from the entrance end 101 of the demultiplexer 311 to the exit end 102 of the multiplexer 316 be $\alpha x$ (dB), the transmission loss with respect to each signal light in the second group from the entrance end 101 of the demultiplexer 311 to the respective output port 313$b$ of the demultiplexer 313 be $\alpha 2$ (dB), and the transmission loss with respect to the third group of signal lights from each input port to the exit end 102 of the multiplexer 316 be $\alpha 3$ (dB).

Then, for each of the signal lights ($\lambda 1$ to $\lambda 8$) in the second group, the intensity Px of the crosstalk component leaking from the demultiplexer 311 to the multiplexer 316 is represented by the following expression (1):

$$Px = P0 - \alpha x \quad (1)$$

The intensity P2 of each of signal lights ($\lambda 1$ to $\lambda 8$) in the second group emitted from the respective output port 313$b$ of the demultiplexer 313 is represented by the following expression (2):

$$P2 = P0 - \alpha 2 \quad (2)$$

Also, the intensity P of each of signal lights ($\lambda 1$ to $\lambda 8$) in the third group emitted from the multiplexer 316 is represented by the following expression (3):

$$P3 = P30 - \alpha 3 \quad (3)$$

It is necessary that the intensity P2 of each of signal lights ($\lambda 1$ to $\lambda 8$) in the second group emitted from the respective output port 313$b$ of the demultiplexer 313 be not lower than the receiving sensitivity $\beta$ (dBm) of the photodetector device connected to the respective output port 313$b$ of the demultiplexer 313. Namely, it is necessary for the intensity P2 and the receiving sensitivity $\beta$ to satisfy the relationship of the following expression (4):

$$P2 \geq \beta \quad (4)$$

Further, in view of the above-mentioned expression (2), it is also necessary to satisfy the following expression (5):

$$P \geq \alpha 2 + \beta \quad (5)$$

Also, since the signal lights of the third group are identical to those of the second group in this embodiment, it is necessary that the intensity Px of each of the signal lights ($\lambda 1$ to $\lambda 8$) in the second group leaking from the demultiplexer 311 to the multiplexer 316 be not greater than the permissible crosstalk level (not greater than the receiving sensitivity level in the WDM transmission repeater at the next stage). Further, it is necessary that the intensity of the crosstalk component in each signal light in the second group be lower than the crosstalk suppressing ratio $\gamma$ (dB) with respect to the intensity P3 of each of signal lights ($\lambda 1$ to $\lambda 8$) in the third group emitted from the multiplexer 316. Namely, it is necessary for the crosstalk component of each signal light in the second group to satisfy the relationship of the following expression (6):

$$Px \geq P3 - \gamma \quad (6)$$

Further, in view of the above-mentioned expressions (1) and (3), it is necessary to satisfy the following expression (7):

$$P0 \leq P30 - \alpha 3 + \alpha x - \gamma \quad (7)$$

For example, the above-mentioned crosstalk suppressing ratio $\gamma$ is 25 dB.

Therefore, it is necessary that the intensity P0 of each of 32 waves of signal lights (included in the WDM signal group) entering the demultiplexer 311 of the WDM transmission repeater 31 be within the range satisfying both of the above-mentioned expressions (5) and (7). Hence, in order to satisfy these conditions, the intensity of each of 32 signal lights sent out from the transmitter 10 is adjusted in view of the intensity P0 of each of 32 signal lights entering the demultiplexer 311 of the WDM transmission repeater 31, i.e., transmission loss in the optical fiber line 41. Also, the configuration may be such that the respective optical amplification gains of the optical amplifiers 312, 315 are adjusted so as to regulate the values of transmission loss $\alpha 2$, $\alpha 3$, or such that the intensity P30 of each signal light in the third group taken in from the respective input port 314$b$ of the multiplexer 314 is adjusted.

As explained in the foregoing, by appropriately setting the intensity of each signal light, the WDM transmission system, WDM transmission repeater, and WDM transmission method according to the first embodiment can overcome the problem of crosstalk. Also, an optical ADM comprising inexpensive demultiplexer and multiplexer such as that shown in FIG. 3 may be employed, whereby inexpensive optical amplifiers can be used though the number thereof increases. Further, the optical amplifier is unnecessary in some instances, whereby the system as a whole becomes inexpensive. The optical amplifier has a high reliability since no high gain is required therefor. Also, since it does not optically amplify the whole WDM signal group including 32 waves collectively but 8 waves by 8 waves, the risk of all the waves simultaneously failing to establish communications is low. Therefore, this embodiment can suitably be used between local stations.

SECOND EMBODIMENT OF WDM TRANSMISSION REPEATER

Figure 4:
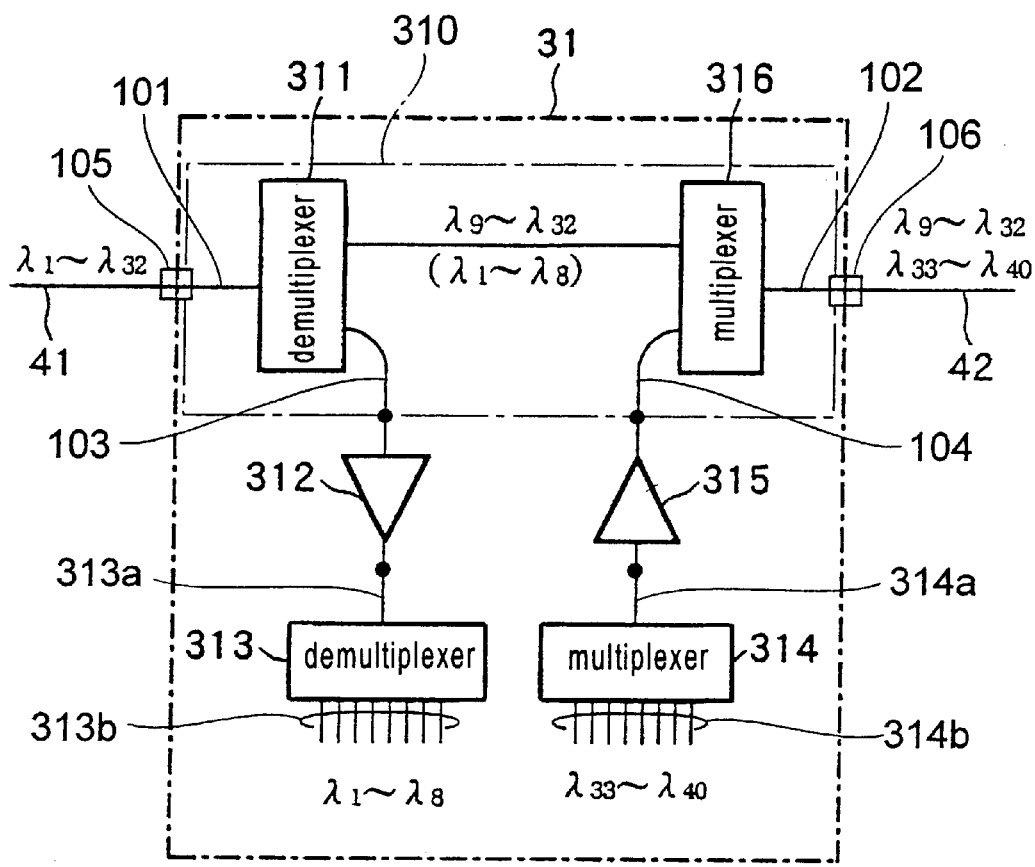
FIG. 4 is a diagram showing the schematic configuration of a second embodiment of the WDM transmission repeater according to the present invention.

FIG. 4 is a diagram showing the schematic configuration of a second embodiment of the WDM transmission repeater according to the present invention. In the WDM transmission repeater according to the second embodiment, the signal lights (λ33 to λ40) in the third group fed into the respective input ports 314b of the multiplexer 314 differ from the signal lights (λ1 to λ8) in the second group emitted from their corresponding output ports 313b of the demultiplexer 313. The second embodiment comprises a structure for overcoming the problem of crosstalk by appropriately setting the signal lights (λ33 to λ40) in the third group. Here, if the intensity of each signal light is sufficient, then it is not necessary to provide the optical amplifiers 312, 315.

In the WDM transmission repeater 31 according to the second embodiment, the multiplexer 316 emits not only the signal lights (λ9 to λ32) in the first group demultiplexed by the demultiplexer 311 and the signal lights (λ33 to λ40) in the third group taken in from the respective input ports 314b of the multiplexer 314, but also the crosstalk component in each of the signal lights (λ1 to λ8) that have propagated from the demultiplexer 311 to the multiplexer 316. Therefore, in the second embodiment, the signal lights (λ33 to λ40) in the third group is set so as to have the following relationship with respect to the signal lights (λ9 to λ32) in the first group and the signal lights (λ1 to λ8) in the second group. The optical ADM 310 employed in the second embodiment has the structure shown in FIG. 3.

Figure 5A:
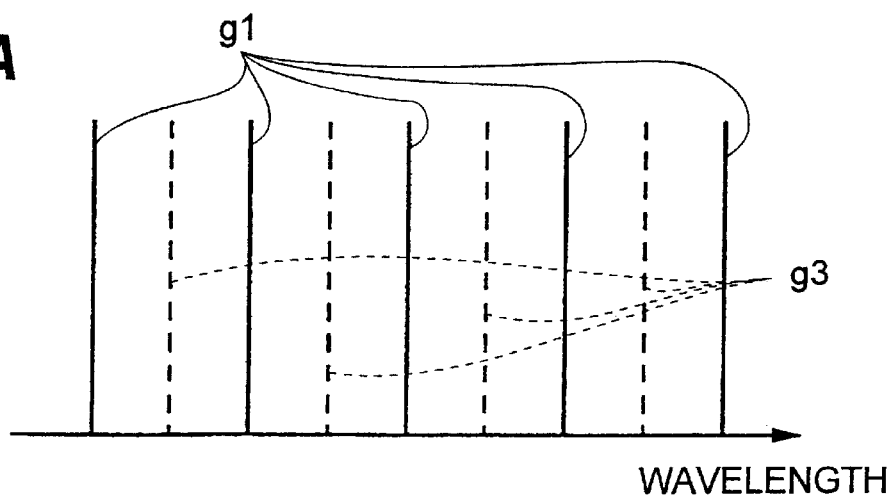
FIGS. 5A to 5C are graphs for explaining a third group of signal light sent out from the WDM transmission repeater shown in FIG. 4.
Figure 5B:
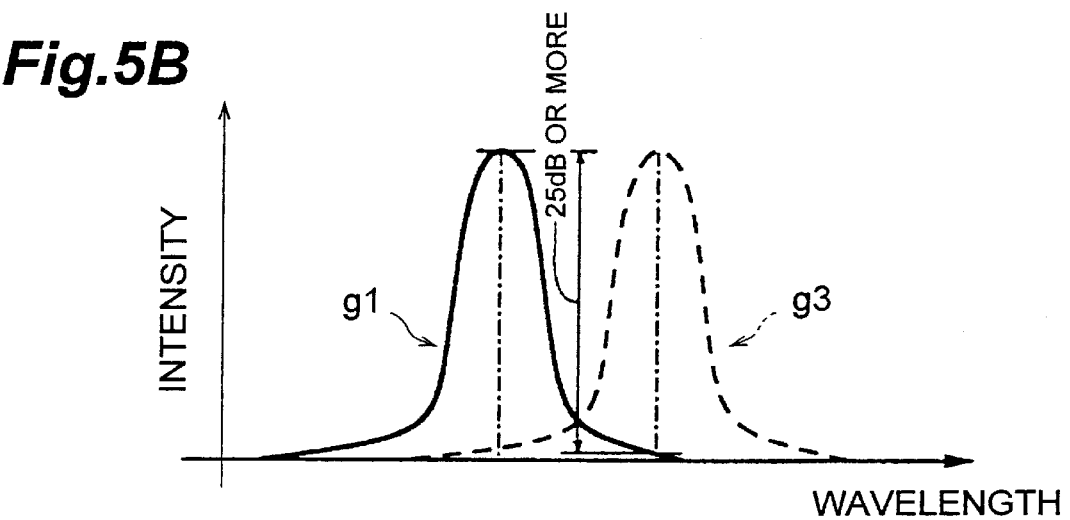
Figure 5C:
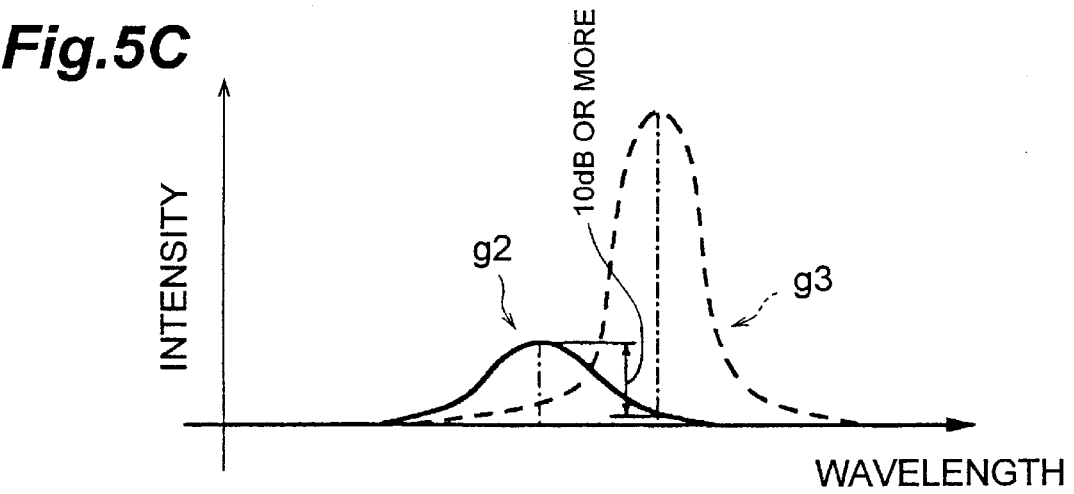

FIGS. 5A to 5C are graphs explaining the third group of signal lights to be sent out from the WDM transmission repeater according to the second embodiment shown in FIG. 4. In FIG. 5A, the respective center wavelength positions of signal lights (λ9 to λ32) in the first group g1 and the respective center wavelength positions of signal lights (λ1 to λ8) in the second group are indicated by solid lines, whereas the respective center wavelength positions of signal lights (λ33 to λ40) in the third group g3 are indicated by broken lines. As depicted, the signal lights (λ33 to λ40) in the third group g3 are set between their respective adjacent two wavelengths within the signal lights (λ9 to λ32) in the first group and signal lights (λ1 to λ8) in the second group, while causing no problem of crosstalk. For example, according to ANNEX-A of ITU Standards, the distance (wavelength difference) between two adjacent wavelengths within the band of 100 GHz is 0.78 nm to 0.82 nm, and the center wavelength of the the signal lights (λ33 to λ40) in the third group is set so as not to cause a problem of crosstalk between these wavelengths.

Here, at the output end 102 of the multiplexer 316, the intensity of each of the signal lights (λ9 to λ32) in the first group g1 is relatively strong, whereas the intensity of each of the signal lights (λ1 to λ8) in the second group g2 is relatively weak. Therefore, in view of this point, the center wavelengths of the signal lights (λ33 to λ40) in the third group g3 are specifically set as follows.

FIG. 5B shows, at the output end 102 of the multiplexer 316, one wavelength spectrum within the signal lights (λ9 to λ32) in the first group g1 by a solid line and one spectrum within the signal lights (λ33 to λ40) in the third group g3 by a broken line. Since the intensity of each of the signal lights (λ9 to λ32) in the first group g1 at the output end 102 of the multiplier 316 is relatively strong, the center wavelength of each of the signal lights (λ33 to λ40) in the third group g3 is set to a wavelength where the intensity of each of the signal lights (λ9 to λ32) in the first group g1 is lower than the intensity (peak intensity) at its center wavelength by at least 25 dB as depicted.

FIG. 5C shows, at the output end 102 of the multiplexer 316, one wavelength spectrum within the signal lights (λ1 to λ8) in the second group g2 by a solid line and one spectrum within the signal lights (λ33 to λ40) in the third group g3 by a broken line. Since the intensity of each of the signal lights (λ1 to λ8) in the second group g2 at the output end 102 of the multiplier 316 is relatively weak, the center wavelength of each of the signal lights (λ33 to λ40) in the third group g3 is set to a wavelength where the intensity of each of the signal lights (λ1 to λ8) in the second group g2 is lower than the intensity (peak intensity) at its center wavelength by at least 10 dB as depicted.

As explained in the foregoing, by appropriately setting the intensity of each signal light, the WDM transmission system, WDM transmission repeater, and WDM transmission method according to the second embodiment can overcome the problem of crosstalk as well. Also, an optical ADM comprising inexpensive demultiplexer and multiplexer such as that shown in FIG. 3 may be employed, whereby inexpensive optical amplifiers can be used though the number thereof increases. Further, the optical amplifier is unnecessary in some instances, whereby the system as a whole becomes inexpensive. The optical amplifier has a high reliability since no high gain is required therefor. Also, since it does not optically amplify the whole WDM signal group including 32 waves collectively but 8 waves by 8 waves, the risk of all the waves simultaneously failing to establish communications is low. Therefore, this embodiment can suitably be used between local stations.

THIRD EMBODIMENT OF WDM TRANSMISSION REPEATER

Figure 6:
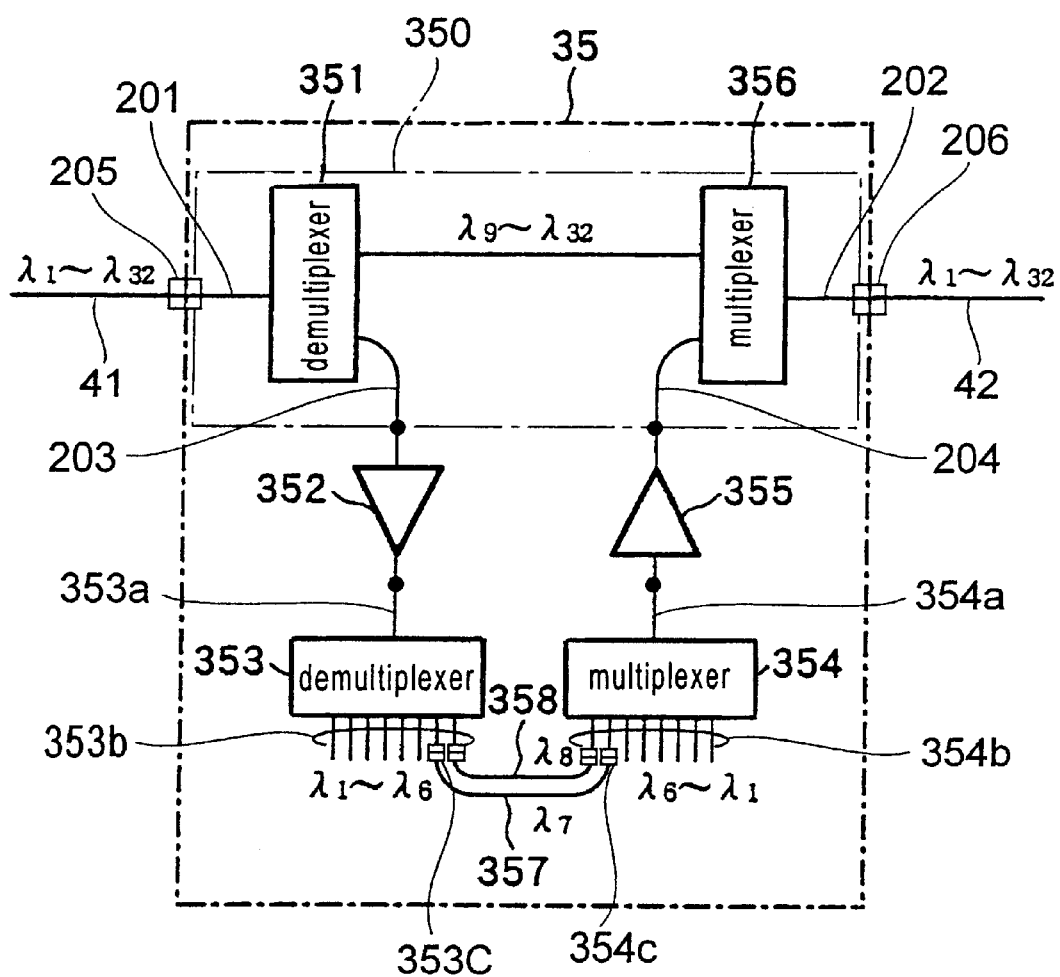
FIG. 6 is a diagram showing the schematic configuration of a third embodiment of the WDM transmission repeater according to the present invention.

FIG. 6 is a diagram showing the schematic configuration of a third embodiment of the WDM transmission repeater according to the present invention. The WDM transmission repeater according to the third embodiment will also be explained in the following as the repeater at the position indicated by A in FIG. 1.

In this drawing, the WDM transmission repeater 35 according to the third embodiment comprises a demultiplexer 351, an optical amplifier 352, a demultiplexer 353 (included in a wavelength separating device), a multiplexer 354 (included in a wavelength multiplexing device), an optical amplifier 355, and a multiplexer 356. Though the demultiplexer 351 and the multiplexer 354 constitute an optical ADM 350 as with the first embodiment, they are equipped with joint structures 353c, 354c, respectively, for connecting bypass lines 357, 358. Here, when the intensity of each signal light is sufficient, it is not necessary to provide the optical amplifiers 352, 355.

The bypass line 357 is detachably disposed, by way of the joint structures 353c, 354c, between the output port 353b for emitting the signal light λ7 within the signal lights (λ1 to λ8) in the second group introduced from the demultiplexer 351 to the demultiplexer 353 and its corresponding input port 354c in the multiplexer 354, whereas the signal light λ7 propagates through the bypass line 357. Similarly, the bypass line 358 is detachably disposed between the output port 353b for emitting the signal light λ8 within the signal lights (λ1 to λ8) in the second group introduced from the demultiplexer 351 to the demultiplexer 353 and its corresponding input port 354c in the multiplexer 354, whereas the signal light λ8 propagates through the bypass line 358.

Therefore, while the WDM transmission repeater 35 according to the third embodiment in the state where the bypass lines 357, 358 are removed therefrom acts like the WDM transmission repeater 31 according to the first embodiment, it acts as follows in the state where the bypass lines 357, 358 are connected thereto.

Namely, the WDM signal group ($\lambda 1$ to $\lambda 32$) including 32 waves having arrived is taken into the optical ADM 350 by way of an entrance end 201, and is demultiplexed into signal lights ($\lambda 9$ to $\lambda 32$) in a first grouup and signal lights ($\lambda 1$ to $\lambda 8$) in a second. group by the demultiplexer 351. The entrance end 201 is optically connected to the optical transmission line 41 by way of a connector 205. The second group of signal lights demultiplexed by the demultiplexer 351 is guided to the optical amplifier 352 by way of an output port 203. The optical amplifier 352 optically amplifies the second group of signal lights as a whole, and emits the second group thus amplified of signal lights to the demultiplexer 353 by way of an entrance port 353*a*. In the demultiplexer 353, the individual signal lights are demultiplexed and outputted to their associated output ports 353*b*. Among them, the signal lights $\lambda 1$ to $\lambda 6$ are received by a light-receiving device or the like. On the other hand, by way of the bypass lines 357, 358, the signal lights $\lambda 7$, $\lambda 8$ are introduced into the multiplexer 354 via their associated input ports 354*c* of the multiplexer 354. The signal lights $\lambda 7$, $\lambda 8$ taken in by way of the respective input ports 354*b* of the multiplexer 354 and the signal lights $\lambda 1$ to $\lambda 6$ to be newly sent out are multiplexed by the multiplexer 354 into a third group of signal lights, which is emitted to the optical amplifier 355 by way of an output port 354*a*. Then, the third group of signal lights optically amplified as a whole by the optical amplifier 355 is multiplexed by the multiplexer 356 together with the first group of signal lights emitted from the demultiplexer 351, and the signal lights thus multiplexed are sent to the optical fiber line 42 by way of an exit end 202. Here, the exit end 202 is optically connected to the optical fiber line 42 by way of a connector 206.

As explained in the foregoing, by appropriately setting the intensity of each signal light, the WDM transmission system, WDM transmission repeater, and WDM transmission method according to the third embodiment can overcome the problem of crosstalk as well. Also, an optical ADM comprising inexpensive demultiplexer and multiplexer such as that shown in FIG. 3 may be employed, whereby inexpensive optical amplifiers can be used though the number thereof increases. Further, the optical amplifier is unnecessary in some instances, whereby the system as a whole becomes inexpensive. Also, the wave number of signal light received by each WDM transmission repeater and the wave number of signal light sent out thereby can be increased and decreased as the bypass lines are attached thereto and detached therefrom as required. The optical amplifier has a high reliability since no high gain is required therefor. Also, since it does not optically amplify the whole WDM signal group including 32 waves collectively but 8 waves by 8 waves, the risk of all the waves simultaneously failing to establish communications is low. Therefore, this embodiment can suitably be used between local stations.

FOURTH EMBODIMENT OF WDM TRANSMISSION REPEATER

Figure 7:
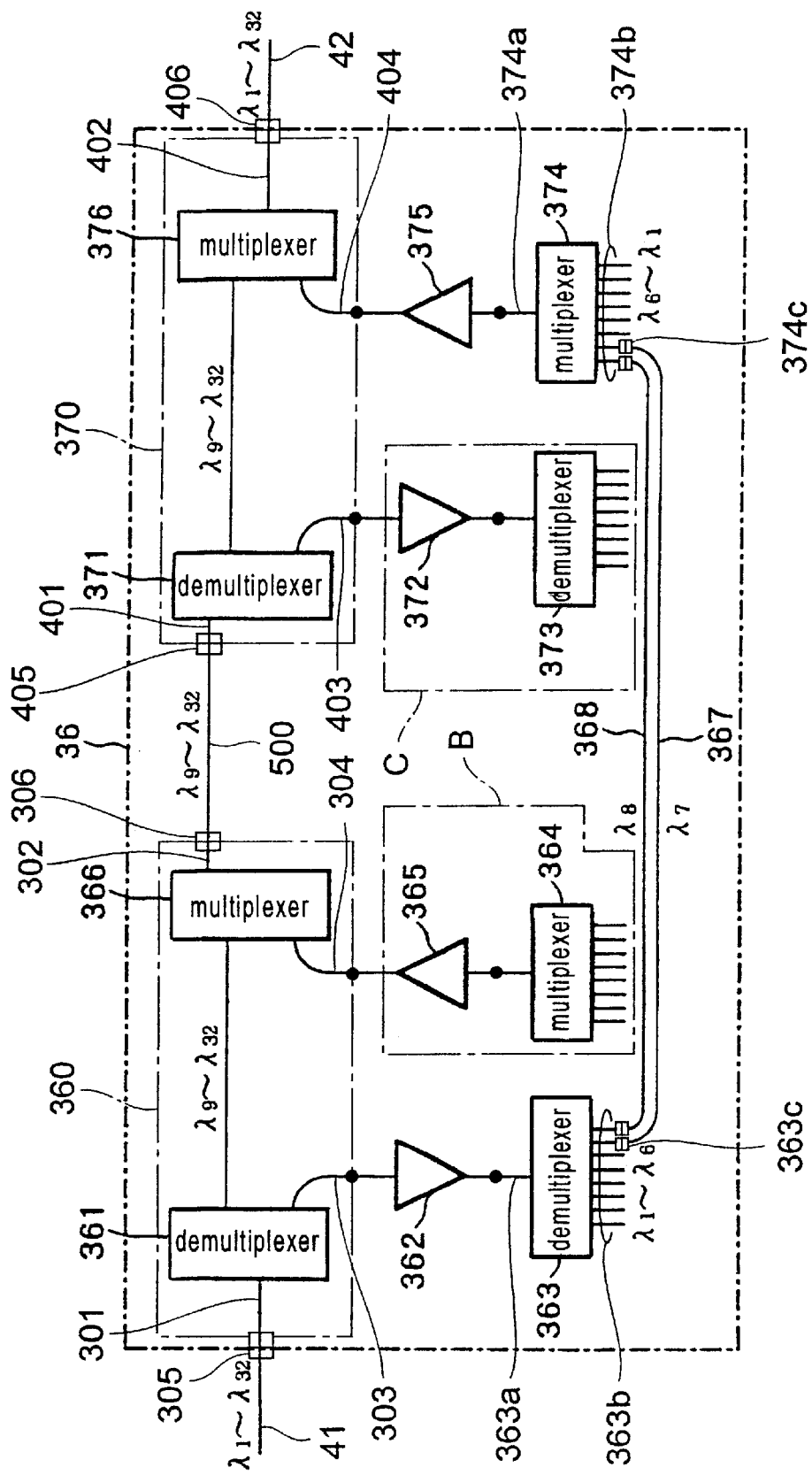
FIG. 7 is a diagram showing the schematic configuration of a fourth embodiment of the WDM transmission repeater according to the present invention.

FIG. 7 is a diagram showing the schematic configuration of a seventh embodiment of the WDM transmission repeater according to the present invention. The WDM transmission repeater according to the fourth embodiment will also be explained in the following as the repeater at the position indicated by A in FIG. 1.

In this drawing, the WDM transmission repeater 36 according to the fourth embodiment comprises a demultiplexer 361, an optical amplifier 362, a demultiplexer 363 (included in a wavelength separating device), a multiplexer 364, an optical amplifier 365, a multiplexer 366, a demultiplexer 371, an optical amplifier 372, a demultiplexer 373, a multiplexer 374 (included in a wavelength multiplexing device), an optical amplifier 375, and a multiplexer 376, while being provided with structures for enabling attachment and detachment of bypass lines 367, 368. The demultiplexer 361 and the multiplexer 366 constitute a first optical ADM 360, whereas the demultiplexer 371 and the multiplexer 376 constitute a second ADM 370. Here, when the intensity of signal light from the optical fiber line 41 is sufficient, it is not necessary to provide the optical amplifiers 362, 365, 372, 375.

The demultiplexer 361 demultiplexes the 32 waves ($\lambda 1$ to $\lambda 32$) of WDM signal group taken in by way of an entrance end 301 into signal lights ($\lambda 9$ to $\lambda 32$) in a first group and signal lights ($\lambda 1$ to $\lambda 8$) in a second group which are different from each other. Here, the entrance end 301 is optically connected to the optical fiber line 41 by way of a connector 305. The optical amplifier 362 collectively optically amplifies the second group of signal lights introduced from the demultiplexer 361 by way of the output port 303. Then, the second group thus amplified of signal lights is taken into the demultiplexer 363 by way of an input port 363*a*. The demultiplexer 363 demultiplexes the amplified signal lights in the second group that have arrived from the demultiplexer 361, and emits the resulting individual signal lights by way of their associated output ports 363*b*.

In this embodiment, it is assumed that there is no input to the individual ports of the multiplexer 364, whereby the multiplexer 364 and optical amplifier 365 indicated by the part B in the drawing do not function as the aimed multiplexing and optical amplifying means. Also, there is no input to the input port 304 of the multiplexer 366 from the optical amplifier 365.

The demultiplexer 371 outputs the signal lights ($\lambda 9$ to $\lambda 32$) in the first group that have arrived by way of an input port 401, as it is, to the multiplexer 376. In this embodiment, the optical amplifier 372 (optically connected to an output port 403) and demultiplexer 373 in the part C in the drawing are not used. Since the demultiplexer 371 also functions to demultiplex the first and second groups of signal lights from each other, it acts to block the second group of signal lights, thus being able to block at least the crosstalk component of each signal light in the second group from the first optical ADM 360. Also, the input port 401 is optically connected to one end of a bridge line 500 by way of a connector 405, whereas the other end of the bridge line 500 is optically connected to the input port 302 of the multiplexer 366 by way of a connector 306. Thus, in the fourth embodiment, the first optical ADM 360 and the second ADM 370 are optically connected to each other by way of the bridge line 500.

On the other hand, the multiplexer 374 feeds the individual signal lights ($\lambda 1$ to $\lambda 8$) in the third group to their corresponding input, ports 374*b*, multiplexes them, and outputs the signal lights thus multiplexed to the optical amplifier 375 by way of an output port 374*a*. The optical amplifier 375 collectively optically amplifies the third group of signal lights emitted from the multiplexer 374. The multiplexer 376 multiplexes the amplified third group of signal lights taken in by way of an input port 404, and the first group of signal lights passed through the demultiplexer 371, and sends the resulting new WDM signal group to the optical fiber line 42 by way of an exit end 402. Here, the exit end 402 is optically connected to the optical fiber line 42 by way of a connector 406.

Further, in this embodiment, the output port 363*b* of the demultiplexer 363 outputting the signal light $\lambda 7$ within the signal lights (λ1 to λ8) in the second group demultiplexed by the demultiplexer 361 and its associated input port 374b of the multiplexer 374 are equipped with joint structures 363c, 374c, respectively, for enabling attachment and detachment of the bypass line 367 (the transmission line for signal light λ7). Similarly, the output port 363b of the demultiplexer 363 outputting the signal light λ8 within the signal lights (λ1 to λ8) in the second group demultiplexed by the demultiplexer 361 and its associated input port 374b of the multiplexer 374 are equipped with joint structures 363c, 374c, respectively, for enabling attachment and detachment of the bypass line 368 (the transmission line for signal light λ8).

Therefore, the WDM transmission repeater 36 according to the fourth embodiment acts as follows in the state where the bypass lines 367, 368 are removed therefrom.

Namely, the WDM signal group (λ1 to λ32) including 32 waves that has arrived by way of the entrance end 301 is demultiplexed into signal lights (λ9 to λ32) in a first group and signal lights (λ1 to λ8) in a second group by the demultiplexer 361. The demultiplexed signal lights in the second group are optically amplified as a whole by the optical amplifier 362, and is guided to the demultiplexer 363 by way of the input port 363a. Then, the individual signal lights in the second group are outputted to their corresponding output ports 363b. The signal lights thus outputted are received by photodetector devices separately connected to the respective output ports 363b. On the other hand, the first group of signal lights reaches the multiplexer 376 after passing through the multiplexer 366 and demultiplexer 371. The signal lights (λ1 to λ8) in the third group are taken in from the respective input ports 374b of the multiplexer 374, and the multiplexed signal lights in the third group are guided to the optical amplifier 375 by way of the output port 374a. After being optically amplified as a whole by the optical amplifier 375, the second group of signal lights is taken into the multiplexer 376 by way of the input port 404. The multiplexer 376 sends the new WDM signal group composed of the first and third groups of signal lights to the optical fiber line 42 by way of the exit end 402. Here, the exit end 402 is optically connected to the optical fiber line 42 by way of the connector 406.

On the other hand, the WDM transmission repeater 36 acts as follows in the state where the bypass lines 367, 368 are connected thereto. Namely, the WDM signal group (λ1 to λ32) including 32 waves that has arrived by way of the entrance end 301 is demultiplexed into the signal lights (λ9 to λ32) in the first group and the signal lights (λ1 to λ8) in the second group by the demultiplexer 361. After being optically amplified as a whole by the optical amplifier 362, the second group of signal lights is taken into the demultiplexer 363 by way of the input port 363a. In the demultiplexer 363, among the received signal lights in the second group, the signal lights (λ1 to λ6) are received by their associated photodetector devices by way of the output ports 363b, whereas the signal lights λ7, λ8 are guided to the input ports 374b of the multiplexer 374 through the bypass lines 367, 368, respectively. The first group of signal light demultiplexed by the demultiplexer 371 successively passes through the demultiplexers 366, 371, so as to reach the multiplexer 376. The signal lights λ7, λ8 taken in from the respective input ports 374b of the multiplexer 374 and the signal lights (λ1 to λ6) newly taken in by way of the input ports 374b are multiplexed by the multiplexer 374 into a third group of signal lights. Then, the third group of signal lights is guided to the optical amplifier 375 by way of the output port 374a, and is optically amplified as a whole by the optical amplifier 375. The multiplexer 376 multiplexes the third group of signal lights taken in by way of the input port 404 and the first group of signal lights, and the resulting new WDM signal group is sent to the optical fiber line 42 by way of the exit end 402. Here, the exit end 402 is optically connected to the optical fiber line 42 by way of the connector 406.

In the fourth embodiment, regardless of whether the bypass lines 367, 368 are connected thereto or not, the crosstalk component of each signal light outputted as crosstalk passes through the two cascaded optical ADMs 360, 370, so as to be finally sent from the exit end 402 to the optical fiber line 42, whereby the unnecessary crosstalk components in the second group become very weak, and the problem of cross talk is overcome. Also, as the multiplexer 364 is provided in addition to the multiplexer 374, the wave number of the WDM signal group sent out from the WDM transmission repeater 36 can be increased. Further, as the demultiplexer 373 is provided in addition to the demultiplexer 363, while the wavelength of each signal light demultiplexed from the demultiplexer 371 into the demultiplexer 373 is made different from the wavelength of each signal light demultiplexed from the demultiplexer 361 into the demultiplexer 363, the number of signal lights received by the WDM transmission repeater 36 can be increased.

As explained in the foregoing, by cascading two optical ADMs, the WDM transmission system, WDM transmission repeater, and WDM transmission method according to the fourth embodiment can overcome the problem of crosstalk as well. Also, an optical ADM comprising inexpensive demultiplexer and multiplexer such as that shown in FIG. 3 may be employed, and the optical amplifier is unnecessary in some instances, whereby the system as a whole becomes inexpensive. Also, the wave number of signal light received by each WDM transmission repeater and the wave number of signal light sent out thereby can be increased and decreased as the bypass lines are attached thereto and detached therefrom as required. The optical amplifier has a high reliability since no high gain is required therefor. Also, since it does not optically amplify the whole WDM signal group including 32 waves collectively but 8 waves by 8 waves, the risk of all the waves simultaneously failing to establish communications is low. Therefore, this embodiment can suitably be used between local stations.

Industrial Applicability

In accordance with the present invention, as explained in the foregoing, since it is provided with various kinds of configurations for effectively restraining the crosstalk component of each signal light received at each repeater station from propagating and so forth, a relatively inexpensive optical device can be utilized as an optical ADM employed for demultiplexing necessary signal light, whereby a WDM transmission system suitable for optical communications between local stations having a relatively short repeater distance can be provided. Also, when each of repeater stations having a short repeater distance therebetween is provided with an optical amplifier, the optical amplification is carried out with a low gain while being restricted to a part of signal light propagating through the transmission line. Therefore, it is possible to provide a WDM transmission system in which the risk of all the waves simultaneously failing to establish communications is low, and in which a sufficient reliability can be obtained even with inexpensive optical amplifiers.

What is claimed is:

1. A WDM transmission repeater comprising:
 a demultiplexer for receiving a plurality of signal lights having wavelengths different from each other, said wavelengths existing within predetermined one wavelength band, said demultiplexer demultiplexing said plurality of signal lights into a first group of signal lights and a second group of signal lights and leaking part of said second group of signal lights as crosstalk;

a multiplexer for multiplexing a third group of signal lights and said first group of signal lights, said third group of signal lights comprising a plurality of signal lights each having a wavelength, included in said predetermined one wavelength band, different from wavelengths of said first group of signal lights;

a wavelength separating device for dividing said second group of signal lights from said demultiplexer every wavelength;

a wavelength multiplexing device for multiplexing said third group of signal lights to be fed into said multiplexer; and one of a transmitter and an optical amplifier for sending out said third group of signal lights, wherein crosstalk suppressing ratios of said third group of signal lights are not lower than a predetermined value with respect to said part of said second group of signal lights leaked as crosstalk.

2. A WDM transmission repeater comprising:

a demultiplexer for receiving a plurality of signal lights having wavelengths different from each other, said wavelengths existing within predetermined one wavelength band, said demultiplexer demultiplexing said plurality of signal lights into a first group of signal lights and a second group of signal lights and leaking part of said second group of signal lights as crosstalk;

a multiplexer for multiplexing a third group of signal lights and said first group of signal lights, said third group of signal lights comprising a plurality of signal lights each having a wavelength, included in said predetermined one wavelength band, different from wavelengths of said first group of signal lights, said multiplexer further leaking part of crosstalk components within said second group of signal lights;

a wavelength separating device for dividing said second group of signal lights from said demultiplexer;

a wavelength multiplexing device for multiplexing said third group of signal lights to be fed into said multiplexer; and a transmitter for sending out said third group of signal lights, wherein crosstalk suppressing ratios of said third group of signal lights are not lower than a predetermined value with respect to said crosstalk components of said second group of signal lights passing through said multiplexer.

3. A WDM transmission method comprising the steps of:

in a repeater, receiving a plurality of signal lights having wavelengths different from each other, said wavelengths being included in predetermined one wavelength band; demultiplexing said plurality of signal lights into a first group of signal lights and a second group of signal lights having wavelengths different from each other;

receiving said second group of signal lights; and multiplexing a third group of signal lights, said first group of signal lights, and part of said second group of signal lights leaked as crosstalk, said third group of signal lights being included in said predetermined one wavelength band while including no signal light having a wavelength common with those of said first group;

wherein a center wavelength of each of said third group of signal lights is located between two wavelengths adjacent to each other among the respective wavelengths of said plurality of signal lights and is a wavelength satisfying a predetermined crosstalk suppressing ratio with respect to each of said two adjacent wavelengths.

4. A WDM transmission method according to claim 3, in which, when a repeater upstream said repeater amplifies said second group of signal lights, the intensity of each of said second group of signal lights is set to an output level after amplification.

5. A WDM transmission method comprising the steps of:

in a repeater, receiving a plurality of signal lights having wavelengths different from each other, said wavelengths being included in predetermined one wavelength band; demultiplexing said plurality of signal lights into a first group of signal lights and a second group of signal lights having wavelengths different from each other;

receiving said second group of signal lights; and multiplexing a third group of signal lights, said first group of signal lights, and part of said second group of signal lights leaked as crosstalk, said third group of signal lights being included in said predetermined one wavelength band while including no signal light having a wavelength common with those of said first group, wherein the intensity of each of said plurality of signal lights reaching said repeater is adjusted in a transmission source thereof such that the intensity of each wavelength of said second group of signal lights received by said repeater is not lower than a receiving sensitivity level of said repeater, while the intensity of each crosstalk component from said repeater concerning each of said second group of signal lights is not greater than a permissible crosstalk level of a repeater positioned downstream said repeater.

6. A WDM transmission method comprising the steps of:

in a repeater, receinving a plurality of signal lights having wavelengths different from each other, said wavelengths being included in predetermined one wavelength band; demultiplexing said plurality of signal lights into a first group of signal lights and a second group of signal lights having wavelengths different from each other;

receiving said second group of signal light; and multiplexing a third group of signal lights, said first group of signal lights, and part of said second group of signal lights leaked as crosstalk and outputting the signal light thus multiplexed, said third group of signal lights being included in said predetermined one wavelength band while including no signal light having a wavelength common with those of said first group, wherein a center wavelength of each of said third group of signal lights is located between two wavelengths adjacent to each other among the respective wavelengths of said plurality of signal lights and is a wavelength satisfying a predetermined crosstalk suppressing ratio with respect to each of said two adjacent wavelengths.

7. A WDM transmission method according to claim 6, wherein the center wavelength of each of said third group of signal lights is a wavelength at which the intensity of each of said first group of signal lights is lower than the intensity at the center wavelength thereof by at least 25 dB.

8. A WDM transmission method according to claim 6, wherein the center wavelength of each of said third group of signal lights is a wavelength existing between two wavelengths adjacent to each other among the respective center wavelengths of said second group of signal lights.

9. A WDM transmission method according to claim 8, wherein the center wavelength of each of said second group of signal lights is a wavelength at which the intensity of each of said second group of signal lights is lower than the intensity at the center wavelength thereof by at least 10 dB.

* * * * *